Dec. 20, 1938.   M. T. KERCHER   2,140,960
SLIDING TOP FOR TRUCKS
Filed April 26, 1938   3 Sheets-Sheet 1
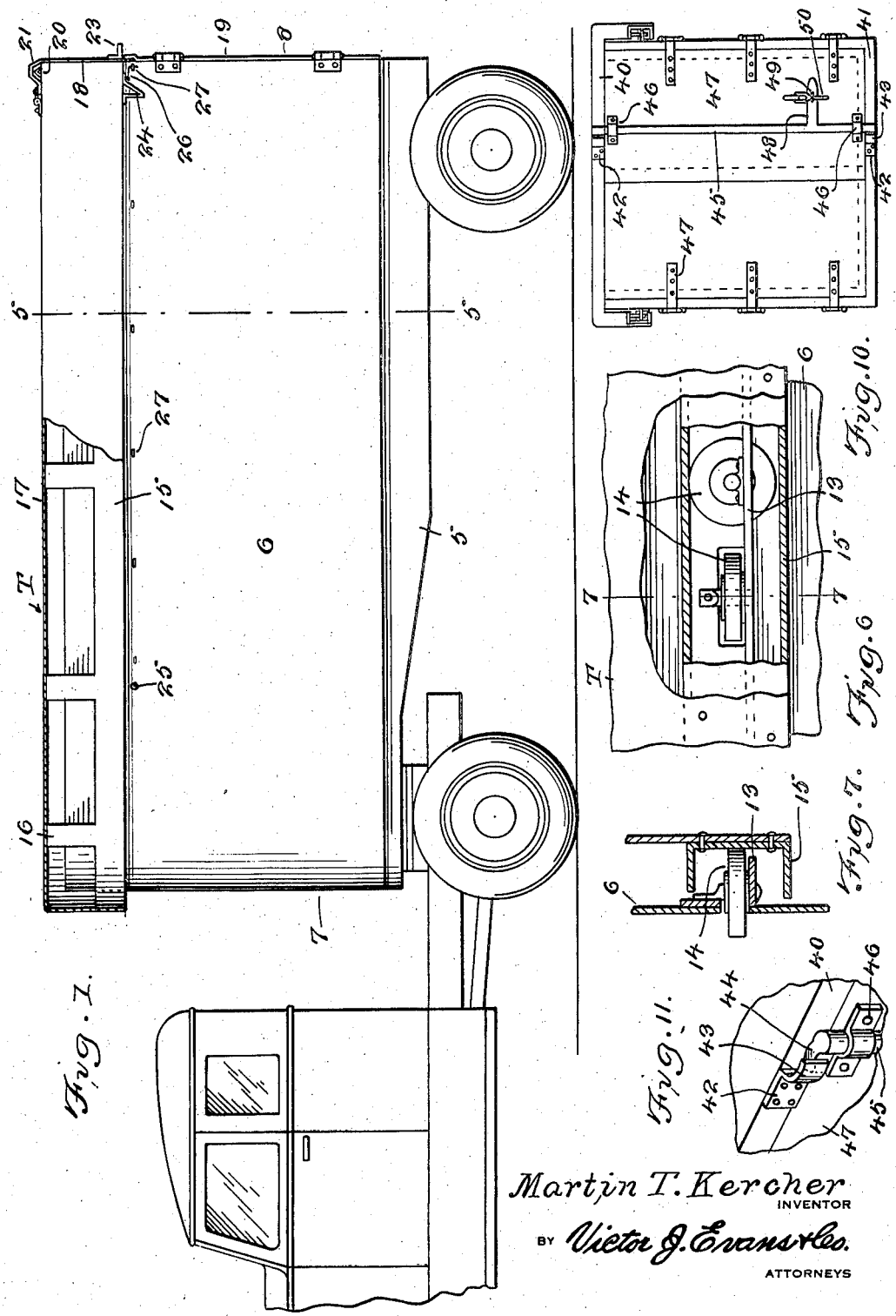
Martin T. Kercher
INVENTOR
BY Victor J. Evans & Co.
ATTORNEYS

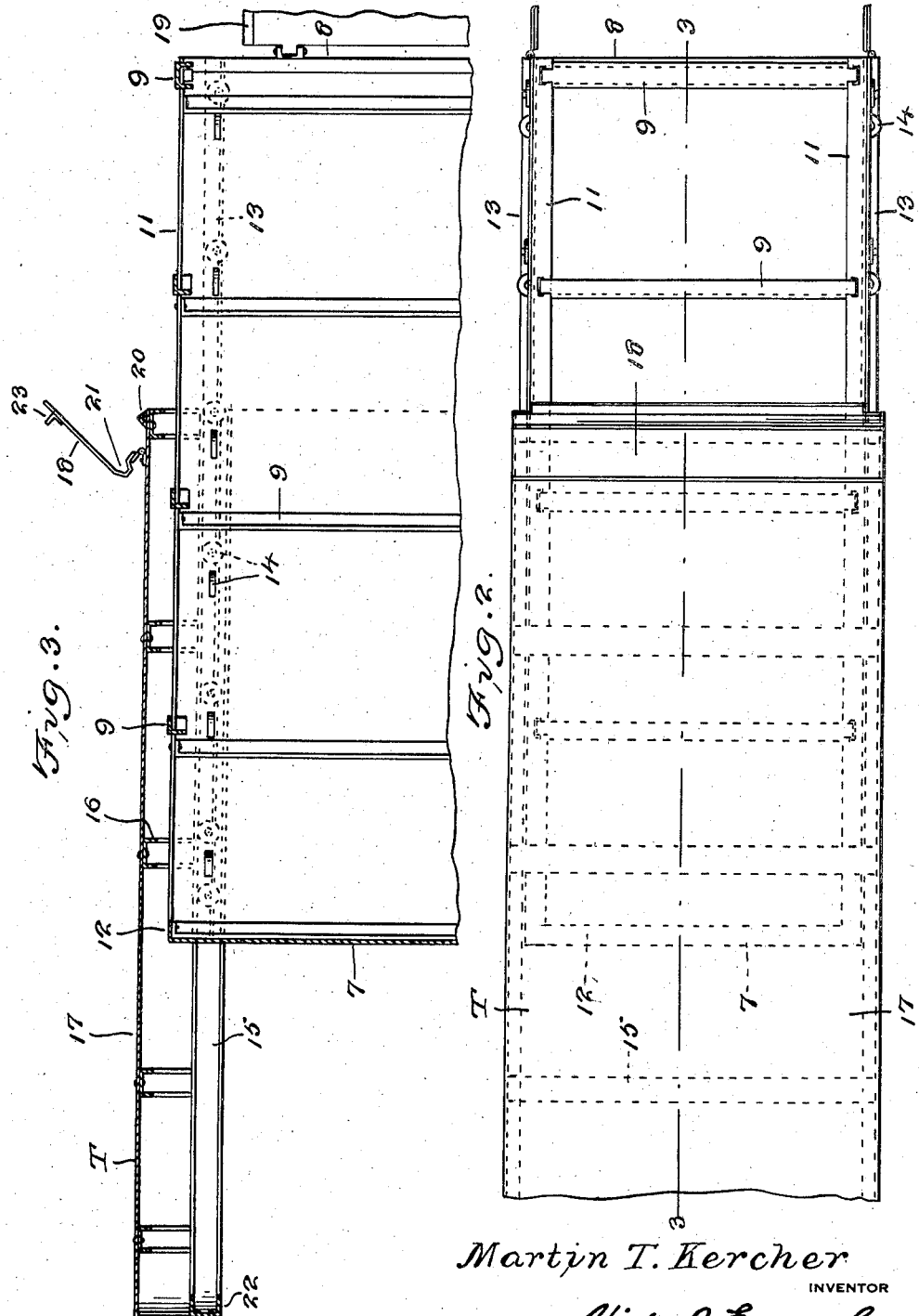

Dec. 20, 1938.    M. T. KERCHER    2,140,960
SLIDING TOP FOR TRUCKS
Filed April 26, 1938    3 Sheets-Sheet 3
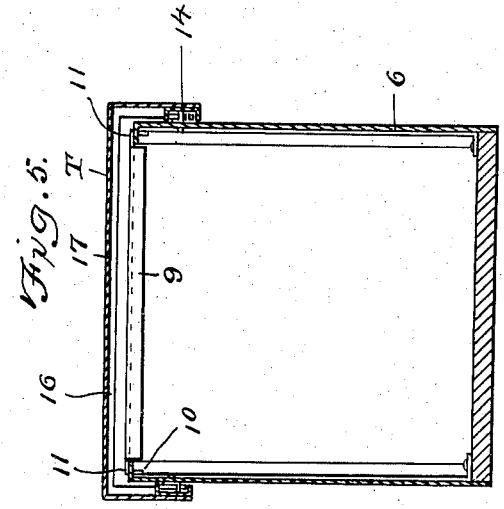
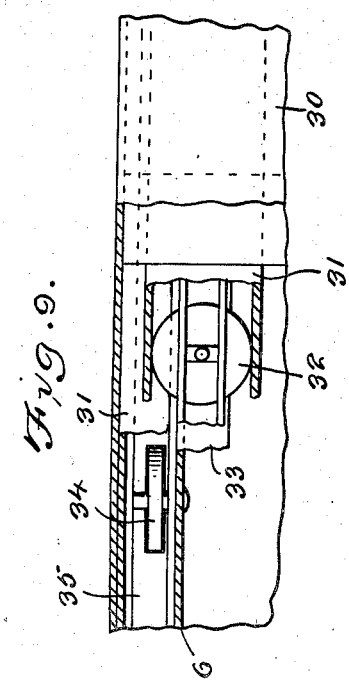
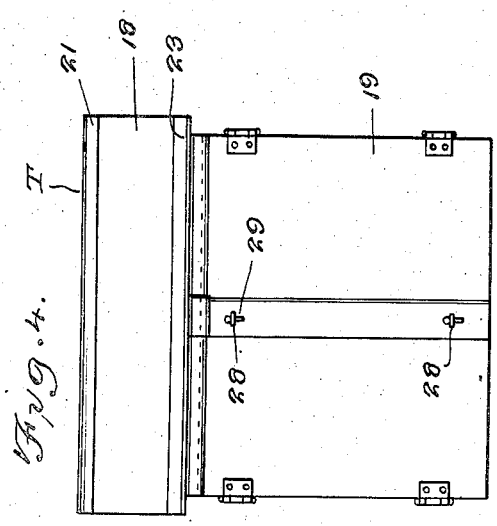
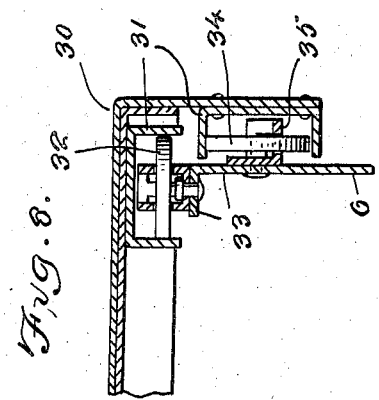
Martyn T. Kercher
INVENTOR
BY Victor J. Evans & Co.
ATTORNEYS Patented Dec. 20, 1938

2,140,960

UNITED STATES PATENT OFFICE 2,140,960

SLIDING TOP FOR TRUCKS

Martin T. Kercher, La Fayette, Ind.

Application April 26, 1938, Serial No. 204,417

5 Claims. (Cl. 296—137)

My invention relates to tops and more particularly to sliding tops for closed and van type trucks.

One of the principal objects of my invention is to provide a sliding top for a truck body wherein the same may be actuated to various positions to permit access to the interior of the body through the top of the latter.

Another object of my invention is to provide a top of the above described character equipped with means serving to brace or reenforce the truck body.

A further object of my invention is to provide a sliding top for trucks equipped with means coacting with the doors of the truck body to effectively maintain the same in closed position and sealed against inclement weather.

A still further object of my invention is to provide a sliding top for a truck body having associated therewith brace members for reenforcing the truck body and which members may be readily detached for the purpose of loading the body.

Still another object of my invention is to provide a sliding top for trucks equipped with means coacting with the truck body for sealing the body and thereby protecting the contents thereof, especially in instances of refrigerator truck bodies.

Another important object of my invention is to provide a truck body equipped with a sliding top which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a side elevation of a truck body illustrating my novel form of top attached thereto, a portion of the top being illustrated in section.

Figure 2 is a top plan view thereof illustrating the top in partly open position.

Figure 3 is a sectional view taken in the plane of line 3—3 of Figure 2.

Figure 4 is a rear elevation of the truck body and top illustrated in Figure 1.

Figure 5 is a sectional view taken on the line 5—5 of Figure 1.

Figure 6 is an enlarged detail side elevation, partly in section, of the roller mechanism for effecting the sliding action of the top.

Figure 7 is a detail sectional view taken on the line 7—7 of Figure 6.

Figure 8 is a transverse detail sectional view of a modified form of roller mechanism employed in connection with van type truck bodies.

Figure 9 is a top plan view partly in section of the modification illustrated in Figure 8.

Figure 10 is a rear elevation of a truck body and top illustrating a modified form of mechanism for maintaining the top and rear doors of the truck body in closed position.

Figure 11 is a detail fragmentary perspective view of a section of the mechanism illustrated in Figure 10.

In practicing my invention, in the preferred embodiment illustrated in Figures 1 to 7 inclusive, I employ a truck body 5 of the closed type having sides 6, closed front and open rear ends 7 and 8 respectively. The top of the truck body 5 is opened and has extending thereacross a plurality of detachable cross members 9 having offset depending ends 10 seated within slots formed in upper edge laterally extending flanges 11. The flanges 11 are connected together at the front end 7 of the truck body by an integrally formed flange 12 which coacts with the cross members 9 in maintaining the sides 6 in fixed position and reenforces the truck body.

Secured to each side 6 of the truck body, subjacent each flange 11, is a longitudinally extending roller support member or angle iron 13 to which is secured pairs of rollers 14. One roller of each pair is mounted on a vertically extending axis and the other on a horizontally extending axis for a purpose hereinafter described. Each of the rollers are provided with bearings secured to the respective angle irons 13.

A sliding top or roof T comprising a frame having longitudinally extending U-shaped channel irons 15 constituting a pair of tracks connected together by transversely extending members 16 and employed for covering the truck body. The longitudinally extending U-shaped channel irons 15 embrace the rollers 14, the roller mounted on the vertically extending axis engaging the side walls of the channel irons and the other rollers engaging the top and bottom walls thereof whereby to receive the lateral and vertical thrusts of the frame.

Secured over the frame is a covering 17 constructed of metal or other suitable material and which extends about the sides and front thereof. The rear section of the covering 17 has hinged thereto a gate 18 extending downwardly and enclosing the rear of the frame and interiorly overlapping the upper sections of a pair of doors 19 hinged to the rear end of the sides 6 of the truck body. Said doors serve to close the rear of said body.

Secured across the upper edge of the covering 17 adjacent the rear end thereof is a V-shaped weather strip 20 adapted to fit within a similar shaped seat 21 formed in the upper section of the gate 18 as clearly illustrated in Figures 1 and 3. The transversely extending members 16 are fashioned with offset depending ends connected to the channel irons 15 and serve to maintain the covering 17 in elevated position above the top of the sides 6 of the body. Secured to the front end of the tracks 15 is a cross member 22 which serves to reenforce the frame and limit the movement of the top or roof when the same is actuated to closed position.

The doors 19 extend upwardly from the bottom of the truck body and terminate subjacent the angle irons 13 and said doors are of a sufficient width wherein the outer ends thereof form an overlapping joint when in closed position thereby coacting with the overlapping section of the gate 18 to effectively maintain the doors and rear end of the truck body in sealed condition against inclement weather.

The overlapping section of the gate 18 is provided with a gutter 23 and said section is of a sufficient resiliency to coact with the member 22 to maintain a tight fit between the body and the top or roof.

Secured to the lower face of the tracks 15 adjacent the rear ends thereof are stop members 24 adapted to engage abutments 25, for instance bolts or the like, extending from the sides 6 subjacent said tracks to limit the forward movement of the roof. Secured to the stop members 24 are hooks 26 having engagement with eye bolts 27 secured to the truck body whereby to latch the roof or top in closed position. Bows 28 secured to one door adjacent the outer edge thereof extend through slots of the overlapping section of the other door and receive pins 29 therethrough for maintaining the doors in closed position.

From the foregoing it will be apparent that when the doors 19 are moved to open position the gate 18 may be pivoted upwardly, as shown in Figure 3, and the roof or top moved towards the front of the truck body to expose the interior of the body. In this position all or any number of the cross members 9 may be removed for the purpose of loading or unloading large objects within the truck.

When the roof is in closed position the gate coacts with the weather strip 20, rear edges of the sides 6 and doors 19 to maintain the body sealed against inclement weather. The gutter 23 serves to prevent rain and the like from entering the interior of the truck along the upper edges of the doors 19.

In truck bodies which do not employ the brace or cross members 22 for reenforcing the same, for instance the van type body, a modified form of track construction is employed as illustrated in Figures 8 and 9. In this construction, each side of the top 30 is provided with a pair of longitudinally extending channel members or tracks 31, one being disposed in horizontally extending position and the other in vertically extending position. The horizontally extending members engage the vertically mounted rollers 32 secured to laterally extending flanges 33 along the upper edges of the sides 6 while the vertically disposed tracks engage horizontally mounted rollers 34 mounted on angle irons 35 secured to the sides of the body, thereby receiving the lateral and vertical thrusts of the top or roof and permitting the same to be moved horizontally relative to the truck body.

In instances where it is not necessary to seal the rear end of the truck body against weather conditions, the gate 18 may be eliminated as illustrated in the modifications in Figures 10 and 11. In a construction of this character the transversely extending rear member 40 and the floor of the truck body 41 are provided with keepers 42 having an outwardly extending arcuate section 43 for receiving a cam 44 integrally secured to the ends of a vertically extending shaft 45 journaled in bearings 46 secured to one of the doors 47. The door carrying said shaft is fashioned with a section exteriorly overlapping a similar section of the other door whereby to maintain said other door in closed position. The shaft 45 is fashioned with a hasp 48 having a slot for receiving a bow 49 carried by the door and through which (the bow) a latch pin 50 is inserted. When the doors are moved to closed position the shaft 45 is rotated in the bearings 46 by means of the hasp 48 in a manner whereby the cams 44 engage the sections 43 of the keepers 42. Continued rotation of the shaft serves to urge the doors to closed position. When the hasp is moved over the bow 49 and the pin inserted through the latter, the doors are maintained in closed position.

What I claim is:

1. A device of the character described, comprising, a truck body having spaced sides, rollers mounted on said sides adjacent the top edges thereof, a frame above said sides equipped with longitudinally extending tracks engaging said rollers and slidable relative thereto and transversely extending members connecting said tracks together, a cover secured over said frame, a gate hinged to the rear end of said frame and extending downwardly beyond said tracks, and a pair of doors hinged to said sides and overlapping said gate whereby to maintain said gate and frame in fixed position.

2. A device of the character described, comprising, a truck body having spaced sides, rollers mounted on said sides adjacent the top edges thereof, a frame above said sides equipped with longitudinally extending tracks engaging said rollers and slidable relative thereto and transversely extending members connecting said tracks together, a cover secured over said frame, a gate hinged to the rear end of said frame and extending downwardly beyond said tracks, a pair of doors hinged to said sides and overlapping said gate whereby to maintain said gate and frame in fixed position, and latching devices securing said frame to said sides when said doors are in open position.

3. A device of the character described, comprising, a truck body having spaced sides, rollers mounted on said sides adjacent the top edges thereof, a frame above said sides equipped with longitudinally extending tracks engaging said rollers and slidable relative thereto and transversely extending members connecting said tracks together, a cover secured over said frame, a gate hinged to the rear end of said frame and extending downwardly beyond said tracks, a pair of doors hinged to said sides and overlapping said gate whereby to maintain said gate and frame in fixed position, and a sealing strip carried by said cover and coacting with said gate whereby to effect a seal between said gate and cover when said gate is in closed position.

4. A device of the character described, comprising, a truck body having spaced sides, rollers mounted on said sides adjacent the top edges thereof, a frame above said sides equipped with longitudinally extending tracks engaging said rollers and slidable relative thereto and transversely extending members connecting said tracks together, a cover secured over said frame, a gate hinged to the rear end of said frame and extending downwardly beyond said tracks, a pair of doors hinged to said sides and overlapping said gate whereby to maintain said gate and frame in fixed position, latching devices securing said frame to said sides when said doors are in open position, and a sealing strip carried by said cover and coacting with said gate whereby to effect a seal between said gate and cover when said gate is in closed position.

5. A device of the character described, comprising, a vehicle body having spaced sides, a top frame slidably mounted on said sides adjacent the top edges thereof, a cover secured over said frame, a gate hinged to the rear end of said frame and extending downwardly therefrom, and a pair of doors hinged to said sides and overlapping said gate whereby to maintain said gate and frame in fixed position.

MARTIN T. KERCHER.